(12) United States Patent
Kujime

(10) Patent No.: US 11,220,138 B2
(45) Date of Patent: Jan. 11, 2022

(54) TIRE

(71) Applicant: Sumitomo Rubber Industries, Ltd., Hyogo (JP)

(72) Inventor: Tomoyuki Kujime, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 528 days.

(21) Appl. No.: 16/117,764

(22) Filed: Aug. 30, 2018

(65) Prior Publication Data
US 2019/0084354 A1    Mar. 21, 2019

(30) Foreign Application Priority Data

Sep. 15, 2017  (JP) .............................. JP2017-178027

(51) Int. Cl.
*B60C 11/03*      (2006.01)
*B60C 11/12*      (2006.01)
*B60C 11/00*      (2006.01)

(52) U.S. Cl.
CPC ...... *B60C 11/0302* (2013.01); *B60C 11/0083* (2013.01); *B60C 11/03* (2013.01); *B60C 11/032* (2013.01); *B60C 11/1236* (2013.01); *B60C 11/1281* (2013.01); *B60C 2011/039* (2013.01); *B60C 2011/0341* (2013.01); *B60C 2011/0358* (2013.01); *B60C 2011/0381* (2013.01); *B60C 2011/0388* (2013.01)

(58) Field of Classification Search
CPC .............. B60C 11/0302; B60C 11/032; B60C 2011/0388; B60C 11/1263; B60C 2011/0381

See application file for complete search history.

(56) References Cited

U.S. PATENT DOCUMENTS

| | | | | |
|---|---|---|---|---|
| 4,726,407 A | * | 2/1988 | Hayakawa | .......... B60C 11/0302 |
| | | | | 152/209.18 |
| 6,571,844 B1 | * | 6/2003 | Ochi | ...................... B60C 11/11 |
| | | | | 152/209.18 |
| 2006/0254684 A1 | * | 11/2006 | Tamura | ............... B60C 11/1369 |
| | | | | 152/209.18 |

(Continued)

FOREIGN PATENT DOCUMENTS

| EP | 2 631 087 A1 | 8/2013 |
|---|---|---|
| EP | 3 323 638 A1 | 5/2018 |

(Continued)

OTHER PUBLICATIONS

English machine translation of JPH09-226323. (Year: 1997).*

(Continued)

*Primary Examiner* — Robert C Dye
(74) *Attorney, Agent, or Firm* — Studebaker & Brackett PC

(57) ABSTRACT

A tire comprises a tread portion provided with two circumferential grooves disposed one each side of the tire equator and extending continuously in the tire circumferential direction, and a shoulder land region defined on the axially outside of each of the two circumferential grooves. The shoulder land region is provided with oblique grooves inclined with respect to the tire axial direction. The oblique grooves include first oblique grooves having axially inner ends, and second oblique grooves having axially inner ends positioned axially outside the axially inner ends of the first oblique grooves.

10 Claims, 7 Drawing Sheets

(56) References Cited

U.S. PATENT DOCUMENTS

| | | | |
|---|---|---|---|
| 2013/0220499 A1* | 8/2013 | Sanae | B60C 11/1392 |
| | | | 152/209.18 |
| 2016/0303918 A1* | 10/2016 | Hayashi | B60C 11/1323 |
| 2017/0036487 A1 | 2/2017 | Kodaka et al. | |

FOREIGN PATENT DOCUMENTS

| | | | |
|---|---|---|---|
| JP | H09-226323 | * | 9/1997 |
| JP | 2005-319890 | * | 11/2005 |
| JP | 2009-101785 | * | 5/2009 |
| JP | 2014-141165 A | | 8/2014 |
| JP | 2017-030604 A | | 2/2017 |

OTHER PUBLICATIONS

English machine translation of JP2005-319890. (Year: 2005).*
The extended European search report issued by the European Patent Office dated Dec. 11, 2018, which corresponds to European Application 18190378.2-1012 and is related to U.S. Appl. No. 16/117,764.

* cited by examiner

TIRE

TECHNICAL FIELD

The present invention relates to a tire, more particularly to a tread pattern suitable for sporty use such as circuit racing.

BACKGROUND ART

The following patent document 1 discloses a street-legal high-performance pneumatic tire suitable for sporty use such as circuit racing. In this tire, the position of the tire when mounted on a car (namely, which side should be outside of the car) is specified. Thus, the tread portion has an outboard tread edge and inboard tread edge. The inboard half tread portion between the inboard tread edge and the tire equator is provided with two circumferential grooves extending continuously in the tire circumferential direction, whereas the outboard half tread portion between the outboard tread edge and the tire equator is provided with no circumferential groove.

In the tire disclosed in the patent document 1, when the ground pressure of the tread portion is sufficiently high, the tread portion can provide good road grip performance. However, when the ground pressure is low, there is a tendency that the proportion of the opening area of the circumferential grooves to the area of the ground contacting patch of the tire is increased, and as a result, the road grip performance becomes low. Therefore, when the tire disclosed in the patent document 1 is used in such a car that the tire load of the rear wheels is lower than the tire load of the front wheels, there is a possibility that the rear tires can not exert sufficient road grip comparable with the front tires.
Patent Document 1:

Japanese Patent Application Publication No. 2017-030604

SUMMARY OF THE INVENTION

Problems to be Resolved by the Invention

It is therefore, an object of the present invention to provide a tire which can exert good road grip even if the ground pressure of the tread portion is relatively low.

According to the present invention, a tire comprises a tread portion provided with two circumferential grooves disposed one each side of the tire equator and extending continuously in the tire circumferential direction, and a shoulder land region defined on the axially outside of each of the two circumferential grooves and provided with oblique grooves inclined with respect to the tire axial direction,
wherein
the oblique grooves include
first oblique grooves having axially inner ends, and
second oblique grooves having axially inner ends positioned axially outside the axially inner ends of the first oblique grooves,
each of the first oblique grooves is curved so as to have, on one of the groove edges, a vertex of curve farthest from a straight line drawn between the axially inner end and an outer end of the first oblique groove, and
the vertexes of curve of the first oblique grooves are positioned axially outside the axially inner ends of the second oblique grooves.

It is preferable that the circumferential grooves are not connected with any grooves disposed in the shoulder land regions.

It is preferable that the tire has an intended tire rotational direction, and the oblique grooves each have the axially outer end positioned on the toe-side in the intended tire rotational direction of the axially inner end.

It is preferable that in each of the first oblique grooves, the distance from the straight line to the vertex of curve is less than a maximum groove width of the first oblique groove.

It is preferable that the groove depth of the second oblique grooves is less than the groove depth of the first oblique grooves.

It is preferable that an axially inside portion of the first oblique groove on the axially inside of the vertex of curve is inclined at an angle of from 25 to 45 degrees with respect to the tire axial direction.

It is preferable that the difference between the angle with respect to the tire axial direction of the straight line of the first oblique groove, and
the angle with respect to the tire axial direction of a straight line drawn between the axially inner end and outer end of the second oblique groove,
is not more than 10 degrees.

It is preferable that a crown land region of the tread portion defined between the two circumferential grooves has a ground contacting surface whose profile is a radially outwardly convex arc in the cross section of the crown land region.

DESCRIPTION OF THE PREFERRED EMBODIMENTS

Embodiments of the present invention will now be described in detail in conjunction with the accompanying drawings.

Figure 1:
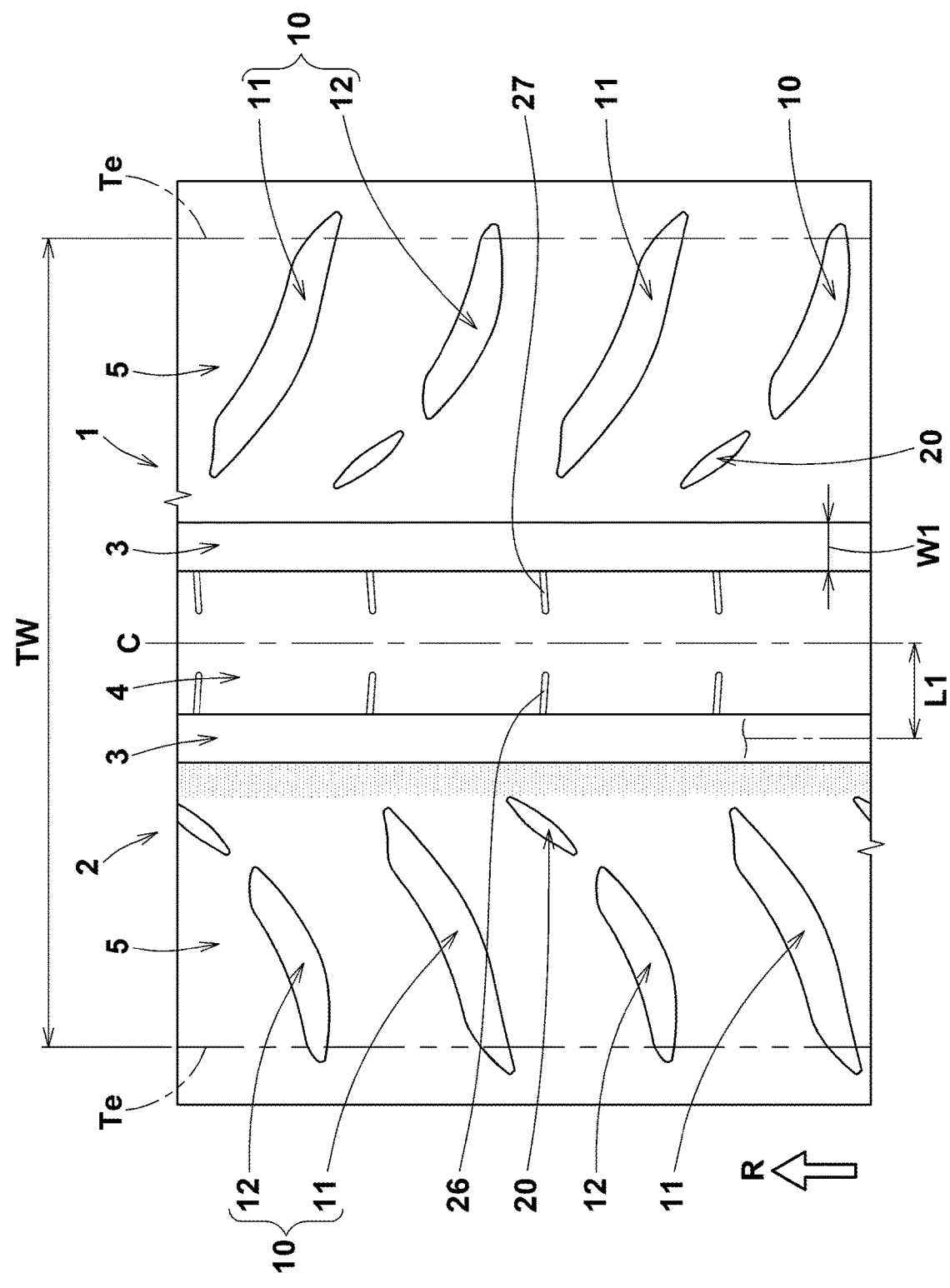
FIG. 1 is a developed partial view of the tread portion of a tire as an embodiment of the present invention.

FIG. 1 shows a part of the tread portion 2 of a tire 1 as an embodiment of the present invention.
The tire 1 in this embodiment is a street-legal high-performance pneumatic tire for passenger cars suitable for sporty use such as circuit racing.

In this embodiment, the tire 1 is provided in the tread portion 2 with a directional tread pattern having an intended tire rotational direction R.
Incidentally, the intended rotational direction R is indicated in the tire sidewall portion (not shown) by markings, characters, symbols and the like.

In this application, the expression "the toe-side in the intended tire rotational direction" means one side in the tire circumferential direction which is toward the opposite direction to the intended tire rotational direction.

The tread portion 2 is provided with two circumferential grooves 3 disposed on each side of the tire equator C and extending continuously in the tire circumferential direction. In this example, each of the circumferential grooves 3 is a straight groove parallel with the tire circumferential direction. However, wavy grooves or zigzag grooves or a combination of two of a wavy groove, a zigzag groove and a straight groove may be employed.

It is preferable that the axial distance L1 from the tire equator C to the widthwise center line of each of the circumferential grooves 3 is set in a range from 0.05 to 0.20 times the tread width TW between the tread edges Te.

The tread edges Te are the axial outermost edges of the ground contacting patch of the tire which occurs under a normally inflated loaded condition when the camber angle of the tire is zero.

The tread width TW is the width measured under a normally inflated unloaded condition, as the axial distance between the tread edges Te determined as above.

The normally inflated unloaded condition is such that the tire is mounted on a standard wheel rim and inflate to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

It is preferable that the circumferential grooves 3 each have a groove width W1 of not more than 20% of the tread width TW. More preferably, the groove width W1 is set in a range from 4.0% to 10.0% of the tread width TW.

When the tire 1 is for passenger cars, it is preferable that the circumferential grooves 3 have a groove depth of from 4 to 10 mm.

The tread portion 2 is divided by the two circumferential grooves 3 into a crown land region 4 between the two circumferential grooves 3, and two shoulder land regions 5 axially outside the circumferential grooves 3.

As shown in FIG. 1, the shoulder land regions 5 are each provided with oblique grooves 10 inclined with respect to the tire axial direction.

In this embodiment, each of the oblique grooves 10 extends from its axially inner end to outer end, while inclining toward the opposite direction to the intended tire rotational direction R. However, the oblique grooves 10 are not limited to such inclining direction.

The oblique grooves 10 include first oblique grooves 11 and second oblique grooves 12.

The first oblique grooves 11 have axially inner ends 11$i$, and the second oblique grooves 12 have axially inner ends 12$i$ positioned axially outside the inner ends 11$i$ of the first oblique grooves 11.

In this embodiment, the first oblique grooves 11 and the second oblique grooves 12 are arranged alternately in the tire circumferential direction in each shoulder portion.

Figure 3:
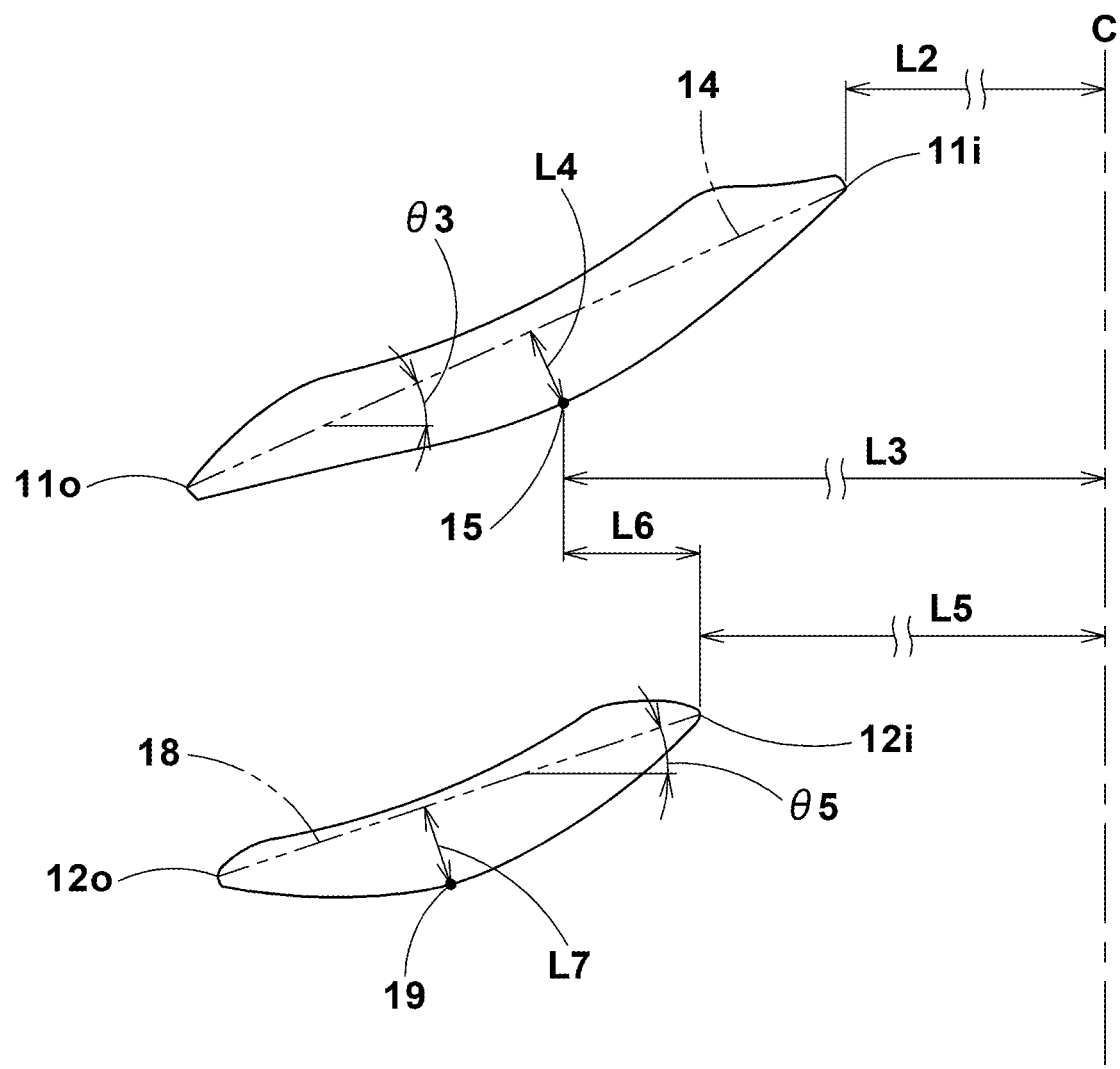
FIG. 3 is an enlarged view showing a first oblique groove and a second oblique groove shown in FIG. 2.

As shown in FIG. 3, the first oblique groove 11 has, on one of the groove edges, a vertex of curve 15 farthest from a straight line 14 drawn between the axially inner end 11$i$ and the axially outer end 11$o$. And the vertex of curve 15 is positioned axially outside the axially inner end 12$i$ of the second oblique groove 12.

Accordingly, in the tire axial direction, the axially inner ends 12$i$ of the second oblique grooves 12 are positioned between the axially inner ends 11$i$ and the vertexes of curve 15 of the first oblique grooves 11.

The axially inner end 11$i$ and the vertex of curve 15 of the first oblique groove 11 and the axially inner end 12$i$ of the second oblique groove 12 are liable to become start positions of deformation of the tread portion 2.

By setting their positions as described above, the ground contact of the shoulder land region 5 can be improved. Thereby, the tire 1 can exert good road grip even if the ground pressure of the tread portion 2 is relatively low.

Figure 2:
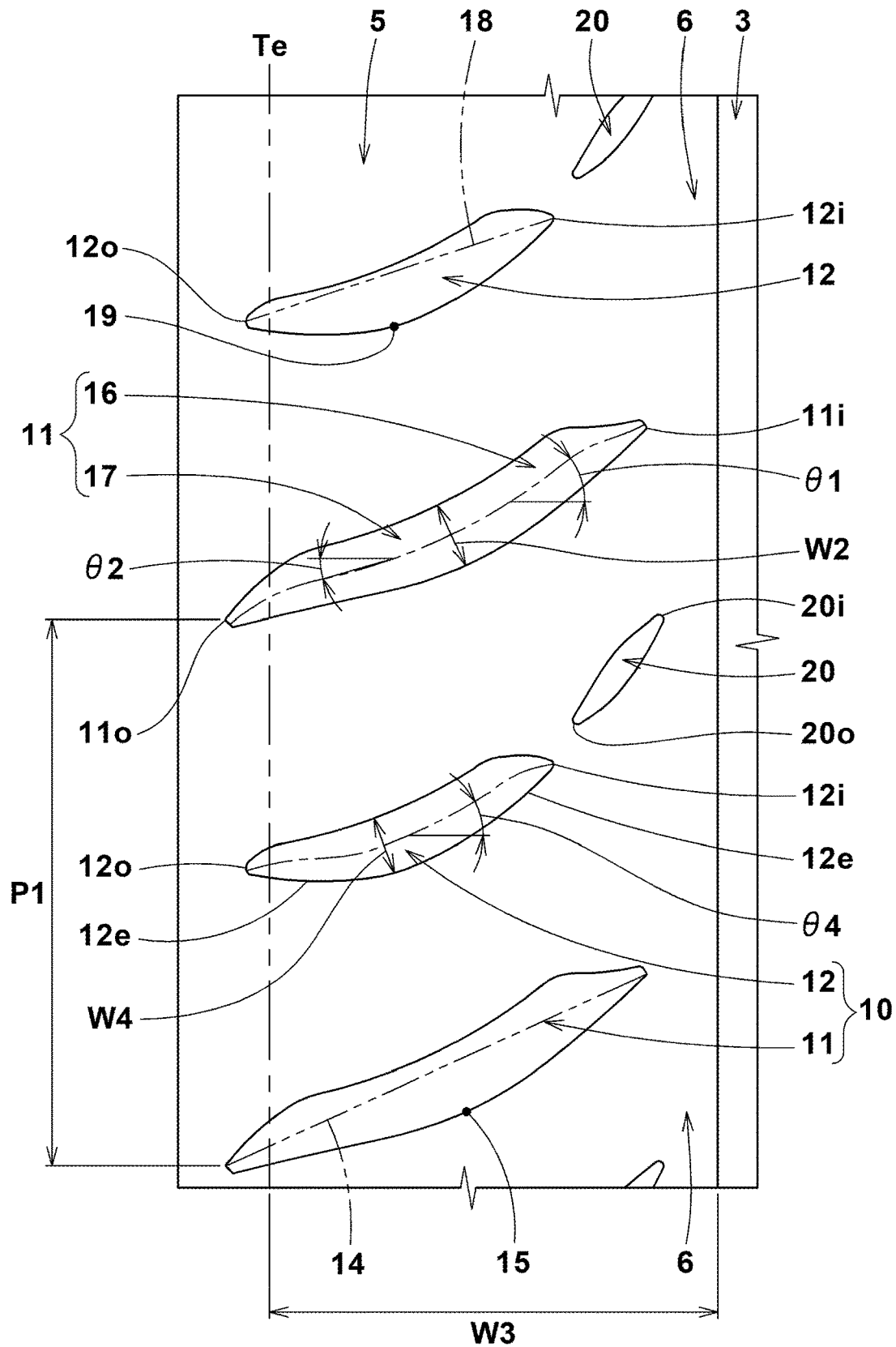
FIG. 2 is a partial top view of the shoulder land region in FIG. 1.

It is preferable that, as shown in FIG. 2, all the first oblique grooves 11 are curved toward the same direction, and the groove edges of the first oblique grooves 11 on the same side in the tire circumferential direction each have no vertex of curve other than the above-said vertex of curve 15.

In this embodiment, the first oblique groove 11 is curved such that the angle with respect to the tire axial direction becomes decreased from the axially inner end 11$i$ toward the axially outer end 11$o$. Preferably, the angle is continuously decreased. However, the first oblique groove 11 is not limited to such configuration. It may be possible that the first oblique groove 11 is partly curved and other part is linear.

The axially inner ends 11$i$ of the first oblique grooves 11 terminate within the respective shoulder land regions 5. It is preferable that the axially outer ends 11$o$ of the first oblique grooves 11 are positioned axially outside the respective tread edges Te. Such first oblique grooves 11 can improve the wet performance, while providing good grip performance by maintaining the rigidity of the shoulder land regions 5.

It is preferable that, as shown in FIG. 3, the distance L2 in the tire axial direction from the tire equator C to the axially inner ends 11$i$ of the first oblique grooves 11 is set in a range from 0.10 to 0.30 times the tread width TW, and the distance L3 in the tire axial direction from the tire equator C to the vertex of curve 15 is set in a range from 0.25 to 0.45 times, more preferably 0.30 to 0.40 times the tread width TW. Such first oblique grooves 11 can improve the wet performance and grip performance on dry roads in good balance.

As shown in FIG. 2, the first oblique groove 11 comprises an axially inside portion 16 on the axially inside of the vertex of curve 15, and an axially outside portion 17 on the axially outside of the vertex of curve 15.

The axially inside portion 16 preferably has an angle θ1 of from 25 to 45 degrees with respect to the tire axial direction. The axially outside portion 17 preferably has am angle θ2 of from 0 to 30 degrees with respect to the tire axial direction.

It is preferable that, as shown in FIG. 3, a straight line 14 drawn between the axially inner end 11i and the axially outer end 11o is inclined at an angle θ3 of from 20 to 30 degrees with respect to the tire axial direction.

It is preferable that the distance L4 from the straight line 14 to the vertex of curve 15 of the first oblique groove 11 is less than the maximum groove width W2 (shown in FIG. 2) of the first oblique groove 11. More specifically, the distance L4 is preferably set in a range from 0.60 to 0.90 times the groove width W2. Such configuration of the first oblique groove 11 can effectively discharge the water in the groove toward the axially outward during running in wet conditions.

In this embodiment, in each of the shoulder portions 5, the second oblique grooves 12 are inclined to the same direction as the first oblique grooves 11.

It is preferable that, similarly to the first oblique groove 11, the second oblique groove 12 has, on one of the groove edges, a vertex of curve 19 farthest from a straight line 18 drawn between the axially inner end 12i and the axially outer end 12o.

It is preferable that the second oblique grooves 12 are curved toward the same direction, and
the angle with respect to the tire axial direction of the second oblique grooves 12 becomes gradually decreased toward the axially outer end 12o from the axially inner end 12i. Preferably, the angle is continuously decreased.

As shown in FIG. 2, the axially inner ends 12i of the second oblique grooves 12 terminate within the respective shoulder land regions 5.

In this embodiment, the axially inner ends of the first oblique grooves 11 and the second oblique grooves 12 terminate within the respective shoulder land regions 5, and the circumferential grooves 3 are not connected with any grooves disposed in the shoulder land regions 5.
The shoulder land regions 5 each have a continuous part 6 extending continuously in the tire circumferential direction. In FIG. 1, one of the two continuous parts 6 is shaded by a thin dot pattern for easy understanding. Such shoulder land regions 5 can exert good grip performance even under low ground pressure conditions.

It is preferable that, as shown in FIG. 3, the distance L5 in the tire axial direction from the tire equator C to the axially inner ends 12i of the second oblique grooves 12 is set in a range from 0.20 to 0.40 times the tread width TW. Thereby, the ground contacting area of a region on the axially inside of the second oblique grooves 12 are secured to provide good grip performance.

In order to increase the ground contact of the shoulder land regions 5, the distance L6 in the tire axial direction between the axially inner end 12i of the second oblique groove 12 and the vertex of curve 15 of the first oblique groove 11 is preferably not less than 0.10 times, more preferably not less than 0.15 times, but preferably not more than 0.30 times, more preferably not more than 0.25 times the axial width W3 of the shoulder land region 5.

It is preferable that, as shown in FIG. 2, the axially outer ends 12o of the second oblique grooves 12 are positioned axially outside the tread edges Te.

It is preferable that the second oblique grooves 12 extend substantially parallel with the first oblique grooves 11.

It is preferable that the angle θ4 with respect to the tire axial direction of the second oblique grooves 12 is set in a range from 0 to 45 degrees.

It is preferable that, as shown in FIG. 3, the angle θ5 with respect to the tire axial direction of a straight line 18 drawn between the axially inner end 12i and axially outer end 12o of the second oblique groove 12 is in a range from 15 to 25 degrees.

It is preferable that the difference between the angle θ5 and the angle θ3 with respect to the tire axial direction of a straight line 14 drawn between the axially inner end 11i and the axially outer end 11o of the first oblique groove 11, is not more than 10 degrees.
Such configuration of the second oblique groove 12 can effectively discharge the water in the groove toward the axial outside during running in wet conditions.

It is preferable that the distance L7 from the straight line 18 to the vertex of curve 19 of the second oblique groove 12 is set in a range from 0.90 to 1.10 times the distance L4 from the straight line 14 to the vertex of curve 15 of the first oblique groove 11. Thereby, uneven wear in the vicinities of the vertexes of curve of the oblique grooves can be prevented.

Figure 4:
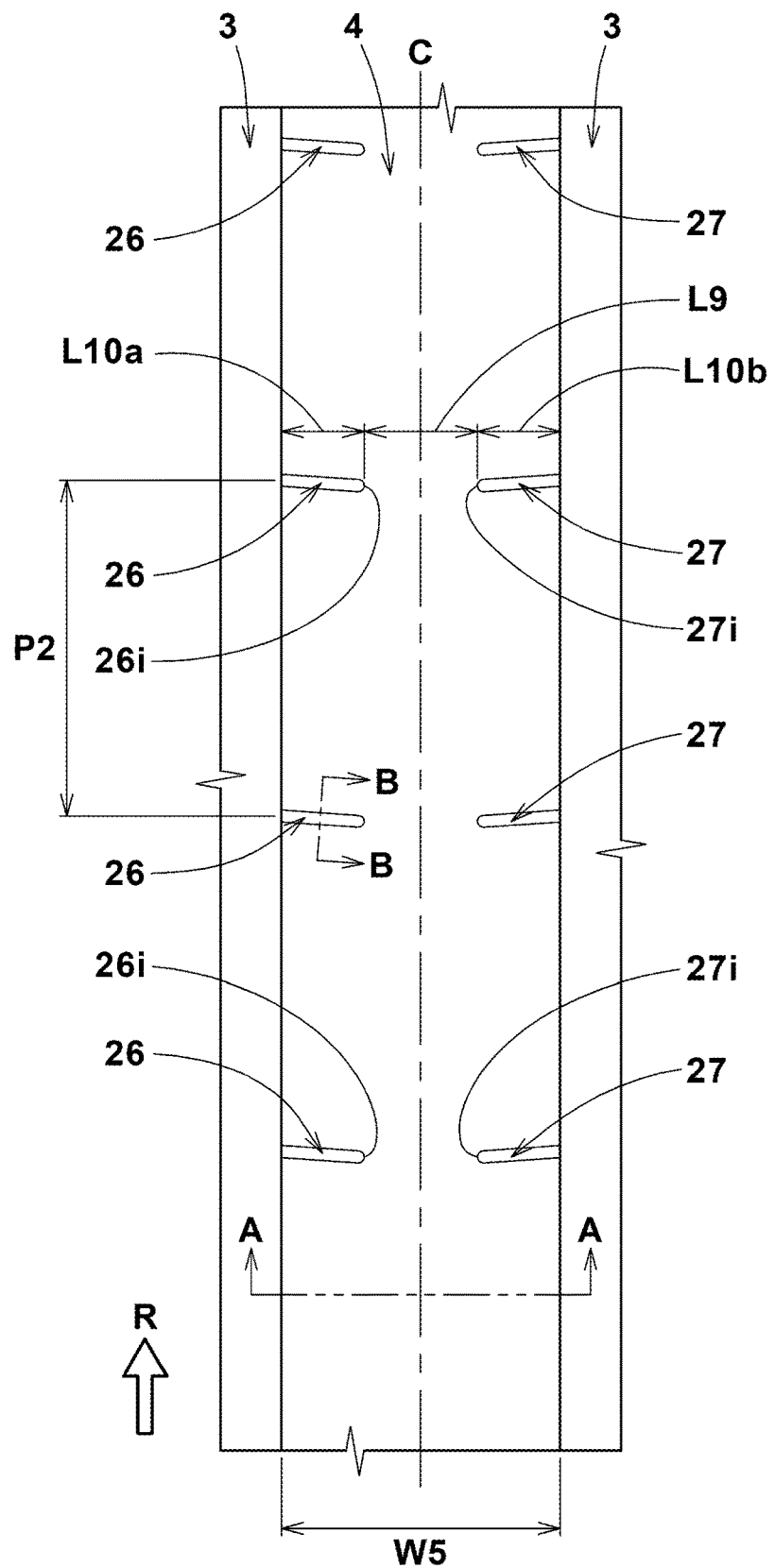
FIG. 4 is a partial top view of the crown land region in FIG. 1.

It is preferable that, as shown in FIG. 4, the maximum groove width W4 of the second oblique groove 12 is less than the maximum groove width W2 of the first oblique groove 11.
More specifically, the groove width W4 of the second oblique groove 12 is preferably set in a range from 0.70 to 0.90 times the groove width W2 of the first oblique groove 11. Such second oblique grooves 12 can improve the wet performance and the grip performance in good balance.

It is preferable that, for the same reason, the second oblique groove 12 has a groove depth less than that of the first oblique groove 11.

In this embodiment, the shoulder land regions 5 are preferably provided with auxiliary grooves 20.
Each of the auxiliary grooves 20 is positioned, for example, so as to overlap with an extension toward the tire equator C of one of the second oblique grooves 12.

Each of the auxiliary grooves 20 has an axially inner end 20i and outer end 20o within the shoulder land region 5. Preferably, the axially inner end 20i is disposed axially inside the axially inner end 11i of the first oblique groove 11, and the axially outer end 20o is disposed axially outside the axially inner end 11i of the first oblique groove 11.
Such auxiliary grooves 20 can improve the wet performance, while maintaining the rigidity of the continuous part 6 of the shoulder land region 5.

In this example, a part of the groove edge of the auxiliary groove 20 is aligned with an axial groove edge 12e on the toe-side in the rotational direction R, of the second oblique groove 12. Thereby, uneven wear at the groove edges of the second oblique groove 12 and auxiliary groove 20 can be prevented.

It is preferable that, as shown in FIG. 4, the axial width W5 of the crown land region 4 is set in a range from 0.10 to 0.30 times the tread width TW.

Figure 5A:
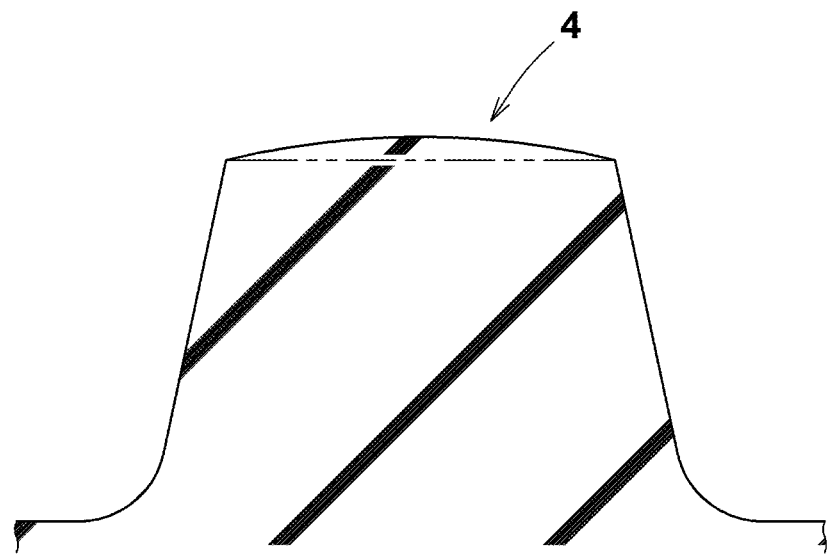
FIG. 5A is a cross sectional view taken along line A-A of FIG. 4.
Figure 5B:
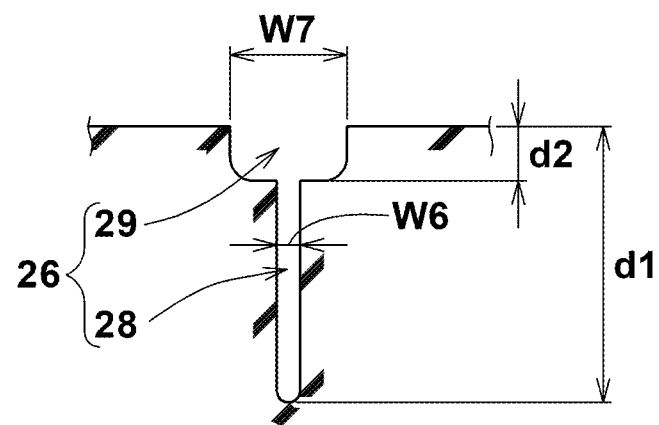
FIG. 5B is a cross sectional view taken along line B-B of FIG. 4.

As shown in FIG. 5A which is a cross sectional view of the crown land region 4 taken along line A-A of FIG. 4, it is preferable that the radially outer surface of the crown land region 4 has a radially outwardly convex arched profile in its cross section. Such configuration of the crown land region 4 can even the ground pressure to provide good grip performance.

It is preferable that, as shown in FIG. 4, the crown land region 4 is provided with first crown sipes 26 and second crown sipes 27.
The first crown sipes 26 extend from one of the circumferential grooves 3 and terminate within the crown land region 4.

The second crown sipes 27 extend from the other circumferential groove 3 and terminate within the crown land region 4.

It is preferable that the axial length L10a of the first crown sipes 26 and the axial length L10b of the second crown sipes 27 are set in a range from 0.20 to 0.40 times the axial width W5 of the crown land region 4, and the crown land region 4 has a part extending continuously in the tire circumferential direction.

The first and second crown sipes can facilitate the temperature rise of the crown land region 4 immediately after starting to run, while suppressing the decrease in the rigidity of the crown land region 4. Accordingly, the crown land region 4 in this embodiment can exert high grip immediately after starting to run.

In this application including the specification and claims, the term "sipe" means a narrow groove having a width not more than 1.5 mm inclusive of a cut having no substantial width. If a sipe has, in the tire radial direction, a widened portion whose width exceeds 1.5 mm, it is called "sipe" as long as its major portion has a width of not more than 1.5 mm.

In this embodiment, the first crown sipes 26 and second crown sipes 27 are disposed line-symmetrically about the tire equator C, and the first crown sipe 26 and second crown sipe 27 are structurally symmetrical. Thus, although the following description is made mainly on the first crown sipe 26, the description is applicable to the second crown sipe 27, namely, applicable to both of the first crown sipes 26 and the second crown sipes 27.

The crown sipes 26 are inclined with respect to the tire axial direction. In this embodiment, the crown sipes 26 extend from the circumferential groove 3, while inclining toward the opposite direction to the intended tire rotational direction R. Preferably, the crown sipes 26 have an angle θ6 of not more than 10 degrees with respect to the tire axial direction.

As shown in FIG. 5A which is a cross sectional view taken along line B-B of FIG. 4, the crown sipe 26 in this embodiment comprises a major portion 28 and a radially outer portion 29. The major portion 28 extends radially outwardly from the bottom with a constant width. The radially outer portion 29 extends radially outwardly from the major portion 28 to open at the tread surface of the tread portion 2 with a larger width than the constant width of the major portion 28. Such crown sipe 26 helps to suppress uneven wear of the crown land region 4.

It is preferable that the major portion 28 has a width W6 of from 0.2 to 1.0 mm. It is preferable that the radially outer portion 29 has a width W7 of from 1.0 to 2.5 mm.
It is preferable that the depth d2 of the radially outer portion 29 is in a range from 0.10 to 0.30 times the depth d1 of the crown sipe 26.
Such crown sipes 26 can speed up the temperature rise of the crown land region 4, while suppressing the decrease in the rigidity of the crown land region 4.

It is preferable that the depth d1 of the crown sipes 26 is set in a range from 0.40 to 0.80 times the depth of the circumferential grooves 3.

As shown in FIG. 4, the first crown sipes 26 and the second crown sipes 27 each have axially inner end within the crown land region 4.
It is preferable that the distances L8 (not shown) in the tire circumferential direction between the axially inner ends 26i of the first crown sipes 26 and the axially inner ends 27i of the second crown sipes 27 are not more than 5 mm.

By arranging the axially inner ends 26i close to the axially inner ends 27i, the temperature of the crown land region 4 becomes more easily to raise.

It is preferable that the distance L9 in the tire axial direction between the axially inner ends 26i of the first crown sipes 26 and the axially inner ends 27i of the second crown sipes 27 is more than the axial length L10a of the first crown sipes 26 and more than the axial length L10b of the second crown sipes 27. Such arrangement of the crown sipes can allow the crown land region 4 to maintain the necessary rigidity for good grip performance.

It is preferable that the pitch length P2 in the tire circumferential direction between the first crown sipes 26 and between the second crown sipes 27 is less than the pitch length P1 in the tire circumferential direction (shown in FIG. 2) of the oblique grooves 11. It is preferable that the pitch length P2 are in a range from 0.4 to 0.6 times the pitch length P1.

It is preferable that, in the tire circumferential direction, the circumferential extents of the respective oblique grooves 10 do not overlap with the circumferential extents of the first and second crown sipes 26 and 27 as shown in FIG. 1. Thereby, uneven wear between the land regions 4 and 5 can be suppressed.

Figure 6:
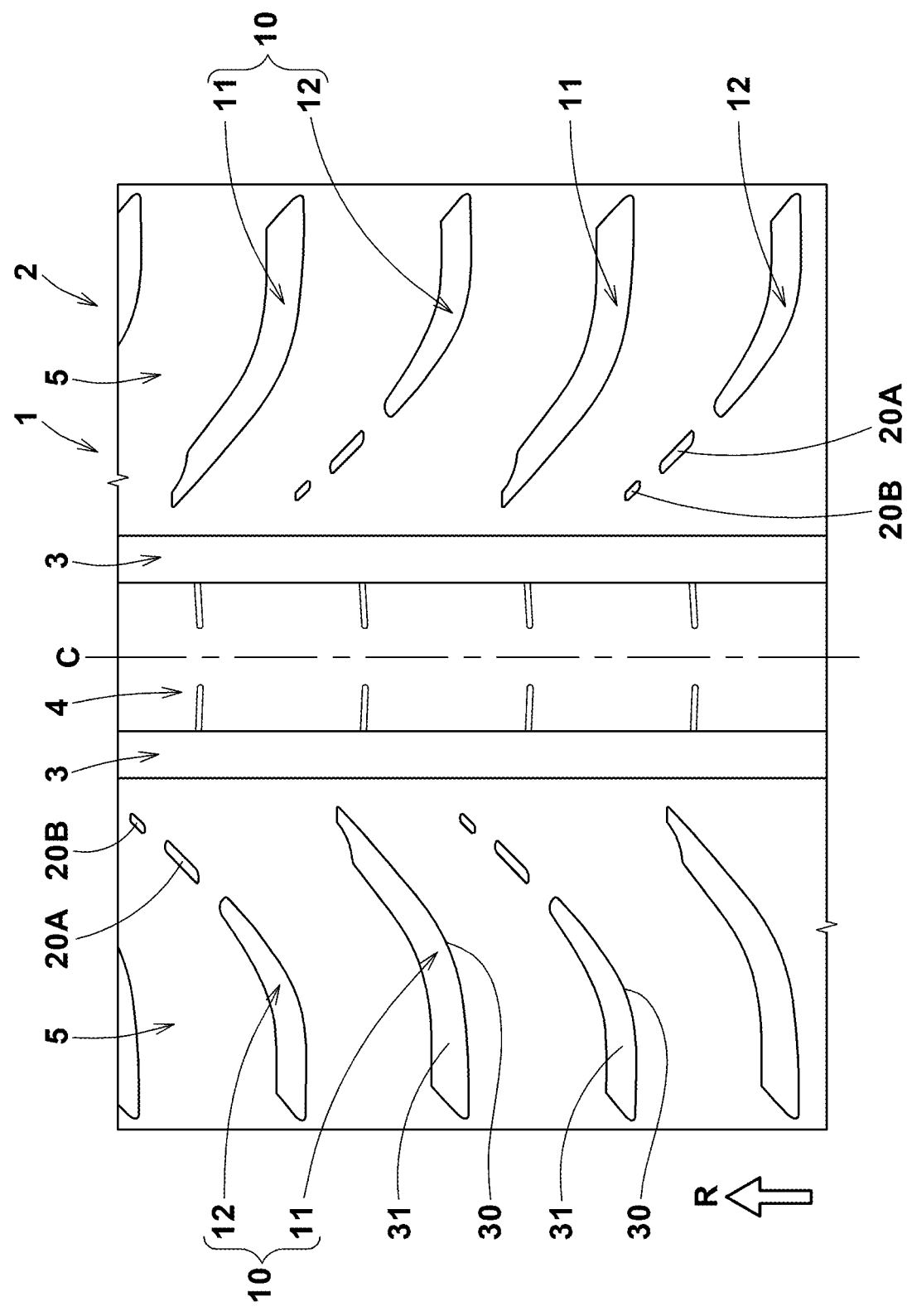
FIG. 6 is a developed partial view of the tread portion of a tire as another embodiment of the present invention.

FIG. 6 shows the tread portion 2 of a tire 1 as another embodiment of the present invention, wherein the same elements as those in the first embodiment are assigned the same reference signs and descriptions are omitted.

In this embodiment, as shown in FIG. 6, each of the oblique grooves 10 has a vertex of curve 30, and an outside portion 31 on the axially outside of the vertex of curve 30 has a part extending along the tire axial direction. Such oblique grooves 10 can maintain the rigidity in the tire axial direction of the shoulder land region 5, and exert high cornering performance.

In this embodiment, each of the shoulder land regions 5 is provided with first auxiliary grooves 20A and second auxiliary grooves 20B.
The first auxiliary groove 20A is disposed closely to the second oblique groove 12, and the second auxiliary grooves 20B is disposed axially inside the first auxiliary groove 20A. In this example, at the tread surface, the opening area of the second auxiliary groove 20B is less than the opening area of the first auxiliary groove 20A.
Such auxiliary grooves 20 can improve the wet performance, while maintaining the rigidity of the shoulder land regions 5.

While detailed description has been made of preferable embodiments of the present invention, the present invention can be embodied in various forms without being limited to the illustrated embodiments.

Comparison Tests

Figure 7:
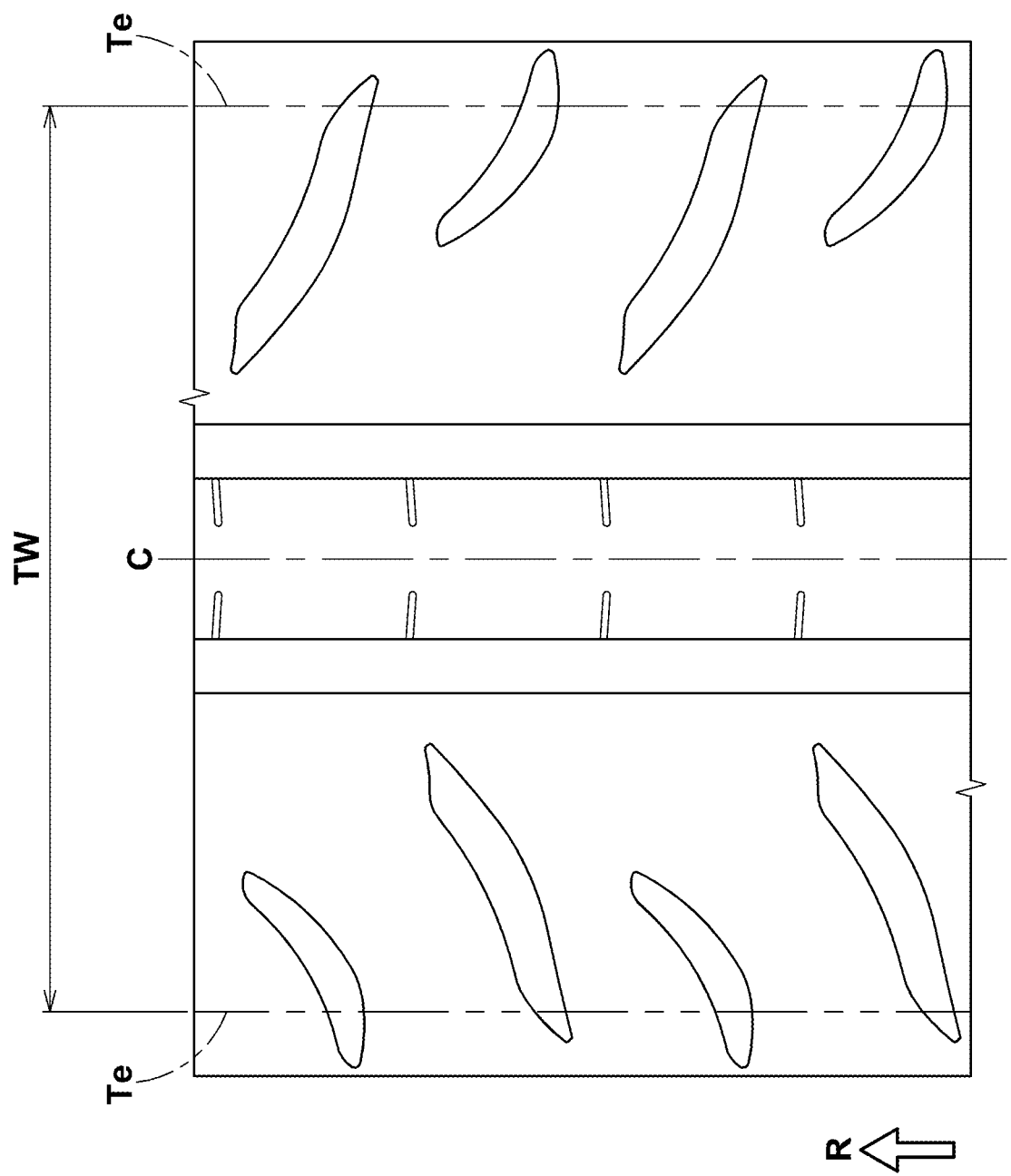
FIG. 7 is a developed partial view of the tread portion of a comparative example tire.

Based on the tread pattern shown in FIG. 1, pneumatic tires of size 205/55R16 (rim size 16×6.5 J) were experimentally manufactured as test tires including working examples Ex.1-Ex.10, and Comparative example Ref.1-Ref.6.
In Comparative example Ref.1, as shown in FIG. 7, the axially inner ends of the second oblique grooves and the vertexes of curve of the first oblique grooves were disposed at the same axial position in each shoulder portion.
In Comparative example Ref.2, the tread pattern was similar to FIG. 7, but the axially inner ends of the second oblique grooves were disposed axially outside the vertexes of curve of the first oblique grooves.

The test tires were tested for grip performance and wet performance, using a test car (2000 cc front engage rear drive passenger car with test tires mounted on all wheels and inflated to 230 kPa).

<Grip Performance>

The test car was run on a dry road surface, and the test driver evaluated the road grip of the rear tires on the drive wheels. The test results are indicated in Table 1 by an index based on Ref.1 being 100, wherein the larger the index number, the better the road grip (namely, the better the grip performance under low ground pressure conditions).

<Wet Performance>

The test car was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in Table 1 by an index based on Ref.1 being 100, wherein the larger the index number, the better the wet performance.

TABLE 1

| Tire | Ref. 1 | Ref. 2 | Ref. 3 | Ex. 1 | Ex. 2 | Ex. 3 | Ex. 4 | Ex. 5 |
|---|---|---|---|---|---|---|---|---|
| tread pattern (FIG. no.) | 7 | 7 | 7 | 1 | 1 | 1 | 1 | 1 |
| distance L3/tread width TW | 0.35 | 0.35 | 0.35 | 0.35 | 0.35 | 0.35 | 0.35 | 0.35 |
| distance L6/width W3 *1 | 0.00 | −0.05 | −0.10 | 0.20 | 0.05 | 0.10 | 0.15 | 0.25 |
| road grip | 100 | 99 | 98 | 108 | 104 | 106 | 107 | 108 |
| wet performance | 100 | 100 | 100 | 103 | 100 | 102 | 103 | 103 |

| Tire | Ex. 6 | Ex. 7 | Ref. 4 | Ref. 5 | Ex. 8 | Ex. 9 | Ex. 10 | Ref. 6 |
|---|---|---|---|---|---|---|---|---|
| tread pattern (FIG. no.) | 1 | 1 | 7 | 7 | 1 | 1 | 1 | 7 |
| distance L3/tread width TW | 0.35 | 0.35 | 0.25 | 0.25 | 0.25 | 0.25 | 0.25 | 0.45 |
| distance L6/width W3 *1 | 0.30 | 0.35 | 0.00 | −0.10 | 0.05 | 0.10 | 0.15 | 0.00 |
| road grip | 107 | 106 | 98 | 98 | 104 | 106 | 107 | 100 |
| wet performance | 103 | 104 | 102 | 101 | 102 | 102 | 103 | 98 |

| Tire | Ex. 11 | Ex. 12 | Ex. 13 | Ex. 14 | Ex. 15 | Ex. 16 |
|---|---|---|---|---|---|---|
| tread pattern (FIG. no.) | 1 | 1 | 1 | 1 | 6 | 6 |
| distance L3/tread width TW | 0.45 | 0.45 | 0.45 | 0.45 | 0.35 | 0.45 |
| distance L6/width W3 *1 | 0.05 | 0.10 | 0.15 | 0.20 | 0.17 | 0.25 |
| grip performance | 103 | 104 | 105 | 105 | 107 | 107 |
| wet performance | 100 | 102 | 103 | 103 | 103 | 104 |

*1) Minus (−) sign means the axially inner ends of the second oblique grooves positioned axially outside the vertexes of curve of the first oblique grooves.

From the test results, it was confirmed that the tires according to the present invention can provide good grip performance even under low ground pressure conditions, and good wet performance.

REFERENCE SIGNS LIST 2 tread portion
3 circumferential groove
5 shoulder land region
10 oblique groove
11 first oblique groove
12 second oblique groove
15 vertex of curve

The invention claimed is:

1. A tire comprising a tread portion provided with two circumferential grooves disposed one on each side of the tire equator and extending continuously in the tire circumferential direction, and a shoulder land region defined on the axially outside of each of the two circumferential grooves and provided with oblique grooves inclined with respect to the tire axial direction, wherein the oblique grooves include
first oblique grooves having axially inner ends, and
second oblique grooves having axially inner ends positioned axially outside the axially inner ends of the first oblique grooves, each of the first oblique grooves is curved so as to have, on one of the groove edges, a vertex of curve farthest from a straight line drawn between the axially inner end and an outer end of the first oblique groove, the vertexes of curve of the first oblique grooves are positioned axially outside the axially inner ends of the second oblique grooves, wherein the tread portion is provided with neither a groove nor a sipe extending axially outwardly from each of the two circumferential grooves, but provided with crown sipes extending axially inwardly from each of the two circumferential grooves and terminated within a crown land region defined between the two circumferential grooves, the tire has an intended tire rotational direction, and the oblique grooves each have the axially outer end positioned on the toe-side in the intended tire rotational direction of the axially inner end, in each of the first oblique grooves, the distance from the straight line to the vertex of curve is less than a maximum groove width of the first oblique groove, the axially outer ends of the first oblique grooves are positioned axially outside respective tread edges of the tread portion, and the axially outer ends of the second oblique grooves are positioned axially outside the respective tread edges.

2. The tire according to claim 1, wherein the groove depth of the second oblique grooves is less than the groove depth of the first oblique grooves.

3. The tire according to claim 1, wherein an axially inside portion of the first oblique groove on the axially inside of the vertex of curve is inclined at an angle of from 25 to 45 degrees with respect to the tire axial direction.

4. The tire according to claim 1, wherein
the difference between
  the angle with respect to the tire axial direction of the straight line of the first oblique groove, and
  the angle with respect to the tire axial direction of a straight line drawn between the axially inner end and outer end of the second oblique groove,
is not more than 10 degrees.

5. The tire according to claim 4, wherein
the crown land region has a ground contacting surface whose profile is a radially outwardly convex arc in the cross section of the crown land region.

6. The tire according to claim 1, wherein
the axially inner ends of the first oblique grooves are positioned at an axial distance of from 0.10 to 0.30 times a tread width of the tread portion from the tire equator.

7. The tire according to claim 1, wherein
the shoulder land regions are provided with auxiliary grooves each overlapping with an extension toward the tire equator of one of the second oblique grooves, and
the auxiliary grooves each have an axially inner end and an axially outer end within the respective shoulder land region, wherein the axially inner end is disposed axially inside the axially inner ends of the first oblique grooves, and the axially outer end is disposed axially outside the axially inner ends of the first oblique grooves.

8. The tire according to claim 1, wherein
each of the first oblique grooves extends from its axially outer end to its axially inner end, while inclining with respect to the tire axial direction toward one side in the tire circumferential direction, and
each of the crown sipes extends from its axially outer end to its axially inner end, while inclining with respect to the tire axial direction toward the other side in the tire circumferential direction.

9. The tire according to claim 8, wherein
the crown sipes include first crown sipes and second crown sipes, the first crown sipes extending from one of the two circumferential grooves and the second crown sipes extending from the other of the two circumferential grooves, and
a pitch length in the tire circumferential direction between the first crown sipes and a pitch length in the tire circumferential direction between the second crown sipes are less than a pitch length in the tire circumferential direction between the first oblique grooves in each of the shoulder land regions.

10. A tire comprising a tread portion provided with two circumferential grooves disposed one on each side of the tire equator and extending continuously in the tire circumferential direction, and a shoulder land region defined on the axially outside of each of the two circumferential grooves and provided with oblique grooves inclined with respect to the tire axial direction, wherein
the oblique grooves include
  first oblique grooves having axially inner ends, and
  second oblique grooves having axially inner ends positioned axially outside the axially inner ends of the first oblique grooves,
each of the first oblique grooves is curved so as to have, on one of the groove edges, a vertex of curve farthest from a straight line drawn between the axially inner end and an outer end of the first oblique groove,
the vertexes of curve of the first oblique grooves are positioned axially outside the axially inner ends of the second oblique grooves,
wherein the tread portion is provided with neither a groove nor a sipe extending axially outwardly from each of the two circumferential grooves, but provided with crown sipes extending axially inwardly from each of the two circumferential grooves and terminated within a crown land region defined between the two circumferential grooves, and
wherein in the tire circumferential direction, circumferential extents of the respective crown sipes do not overlap with circumferential extents of the respective oblique grooves.

* * * * *